(12) United States Patent
Ji et al.

(10) Patent No.: US 10,619,316 B2
(45) Date of Patent: Apr. 14, 2020

(54) MULTIPURPOSE COMBINED FLEXIBLE FLOATING BREAKWATER

(71) Applicant: JIANGSU UNIVERSITY OF SCIENCE AND TECHNOLOGY, Zhenjiang (CN)

(72) Inventors: Chunyan Ji, Zhenjiang (CN); Xiaokang Deng, Zhenjiang (CN); Jianting Guo, Zhenjiang (CN)

(73) Assignee: JIANGSU UNIVERSITY OF SCIENCE AND TECHNOLOGY, Zhenjiang (CN)

( * ) Notice: Subject to any disclaimer, the term of this patent is extended or adjusted under 35 U.S.C. 154(b) by 0 days.

(21) Appl. No.: 16/416,040

(22) Filed: May 17, 2019

(65) Prior Publication Data

US 2019/0271127 A1  Sep. 5, 2019

(51) Int. Cl.
*E02B 3/06* (2006.01)
(52) U.S. Cl.
CPC .................. *E02B 3/062* (2013.01)
(58) Field of Classification Search
CPC .............. E02B 3/062; E02B 15/085
See application file for complete search history.

(56) References Cited

U.S. PATENT DOCUMENTS

| | | | | |
|---|---|---|---|---|
| 4,234,266 A * | 11/1980 | Angioletti | ............... | E02B 3/062 405/26 |
| 7,572,083 B1 * | 8/2009 | Bishop | ................. | E02B 3/062 405/26 |
| 8,137,031 B2 * | 3/2012 | Meyers | ................. | E02B 3/26 405/215 |
| 10,294,620 B1 * | 5/2019 | Peng | ........................ | E02B 3/06 |
| 2003/0190191 A1 * | 10/2003 | Clark | ....................... | E02B 3/062 405/26 |
| 2008/0279631 A1 * | 11/2008 | Bishop | .................... | E02B 3/06 405/21 |
| 2010/0178109 A1 * | 7/2010 | Wilson | ................... | E02B 3/062 405/27 |
| 2013/0170909 A1 * | 7/2013 | Osby | ......................... | E02B 7/02 405/26 |
| 2014/0178130 A1 * | 6/2014 | Kamei, II | ............... | E02B 3/062 405/26 |

(Continued)

FOREIGN PATENT DOCUMENTS

JP              60168803      *  9/1985  ............. E02B 3/062

*Primary Examiner* — Carib A Oquendo
(74) *Attorney, Agent, or Firm* — CBM Patent Consulting, LLC

(57) ABSTRACT

A multipurpose combined flexible floating breakwater, wherein each water-surface wave absorbing structure comprises a rubber buoy, a bearing rope passing through a central hole of the rubber buoy, active shackles connected at two ends of the bearing rope, and anti-sliding devices arranged at two ends of the rubber buoy to prevent the rubber buoy from sliding on the bearing rope randomly; a connecting structure comprises a cross-shaped pull ring and a connecting anchor chain, the cross-shaped pull ring is used for connecting adjacent water-surface wave absorbing structures in the same row, and the connecting anchor chain with two ends connected with the active shackles is used for connecting adjacent water-surface wave absorbing structures in different rows; and the purpose of mooring is achieved through a mooring system.

8 Claims, 7 Drawing Sheets

(56) References Cited

U.S. PATENT DOCUMENTS

2015/0330046 A1* 11/2015 Betcher .................. E02B 3/062
  405/26
2016/0289907 A1* 10/2016 DeCew .................... B66D 1/60
2020/0018033 A1*  1/2020 Ji .............................. E02B 3/16

* cited by examiner

MULTIPURPOSE COMBINED FLEXIBLE FLOATING BREAKWATER

This application claims priority to Chinese Patent Application Ser. No. CN2018112654739 filed on 29 Oct. 2018.

TECHNICAL FIELD

The present invention relates to the field of breakwater technologies, and more particularly, to a multipurpose combined flexible floating breakwater.

BACKGROUND

A breakwater is an important hydraulic structure for a port, which is mainly used to defend waves from the open sea, maintain the stability of an internal water area of the port, provide safe environments for ships to entry and exit the port, loading and unloading operations, and personnel to board and disembark, and protect other engineering structures in the port. In addition, the breakwater can further protect the coastline from erosion.

With the progress of marine engineering technology, function and application field of the breakwater are further developed. The emergence of the floating breakwater expands an application scope of the traditional breakwater, extends an application scope of the breakwater from the port to the open sea and from a shallow water area to a deep water area. Compared with the traditional breakwater, the floating breakwater has the advantages of low cost, simple construction, convenient maintenance and environmental protection. However, with the application of engineering examples, the shortcomings of the floating breakwater are constantly exposed, such as the inability to quickly arrange and evacuate temporary construction covers.

With the continuous exploration and development of the ocean by human beings, offshore operations are becoming more and more frequent. Offshore operations have extremely strict requirements on sea conditions, and often need to wait for a long time to expect a working environment with low storms. However, the marine environment is always unpredictable. Therefore, there is usually the condition that the operations have to be terminated due to changes in the marine environment. As is known to all, a price of an engineering ship and salaries of the personnel are extremely high, which may lead to high cost and low efficiency of offshore operation, and even there is sometimes the operation accident caused by storm that is not avoided in time.

The existing floating breakwater has a more complex configuration, most of the materials are steel or marine engineering concrete C50, and due to a huge size, the mass is naturally large, so that long distance transportation and quick arrangement cannot be realized.

SUMMARY

Object of the invention: in order to overcome the defects existing in the prior art, the present invention provides a multipurpose combined flexible floating breakwater, which reduces the weight and the manufacturing cost of the floating breakwater by using the inflatable floodable rubber buoy, and using air and seawater as working media, after the work is finished, the air and the seawater in the rubber buoy are discharged, and the rubber buoy is folded, so that a volume is reduced to facilitate transportation; and the active shackles are used in the connecting structure and the mooring system for connection, which improves the installation and disassembly efficiency of the breakwater.

Technical solution: in order to solve the technical problems above, a multipurpose combined flexible floating breakwater according to the present invention comprises a plurality of water-surface wave absorbing structures and connecting structures, and a mooring system, wherein each water-surface wave absorbing structure is connected through the connecting structure, and each water-surface wave absorbing structure is moored and fixed through the mooring system; each water-surface wave absorbing structure comprises a rubber buoy, a corresponding bearing rope, active shackles and anti-sliding devices, the entire rubber buoy is arranged transversely against waves and is provided with a central hole along a central axis of a body thereof, the bearing rope passes through the central hole of the corresponding rubber buoy and extends out of end surfaces of two ends of the rubber buoy, end parts of two ends of the bearing rope are both provided with the active shackles (a specific installation method can be that the active shackles are tightly tied by the bearing rope), and the anti-sliding devices are installed on the bearing rope between the active shackle and the rubber buoy to prevent the rubber buoy from sliding freely on the bearing rope; and the connecting structure comprises a cross-shaped pull ring and a connecting anchor chain, every two adjacent water-surface wave absorbing structures in the same row are connected by the cross-shaped pull ring, every two adjacent water-surface wave absorbing structures in the same column are connected by the connecting anchor chain, two ends of the connecting anchor chain are also provided with the active shackles, and the cross-shaped pull ring and the connecting anchor chain are combined to connect the water-surface wave absorbing structures to resist waves together.

Further, a semi-tensioned mooring mode is used in the mooring system, the mooring system comprises a plurality of mooring ropes, an upper end of the mooring rope is connected with the corresponding water-surface wave absorbing structure through the active shackle, a bottom end of the mooring rope is provided with a large-gripping anchor (for providing a mooring force required by the breakwater), the active shackle on the mooring rope is connected with buttonholes on two sides of the cross-shaped pull ring, so that the water-surface wave absorbing structure can be quickly connected with the mooring system, and is also convenient to be separated from the mooring system after the work is finished, thus achieving the effects of quick installation and quick disassembly, and the mooring rope is made of nylon rope.

Further, the anti-sliding device comprises a circular rubber gasket, a central hole is arranged in a center of the circular rubber gasket and is opened and closed through a hanging buckle, that is, the entire anti-sliding device is a circular ring, the circular ring is provided with an opening to divide the circular rubber gasket into two parts, the two parts are movably connected through the hanging buckle, the hanging buckle comprises a hanging hook and a clamping groove, the hanging buckle and the clamping groove are respectively arranged at the circular rubber gasket in two parts, and the hanging hook can be clamped in the clamping groove. A diameter of the anti-sliding device is slightly larger than a diameter of the central hole of the rubber buoy, and meanwhile, a diameter of a central hole of the anti-sliding device is larger than a diameter of the bearing rope, and the diameter of the central hole of the anti-sliding device is smaller than a size of the active shackle (thus facilitating the insertion of the bearing rope into the active shackle in an installation process).

Further, the entire rubber buoy is in a hollow cylinder shape, the central hole is reserved at a position of the central axis, an upper part (i.e., a space between the central hole and an upper inner wall of the rubber buoy) in the rubber buoy is provided with an air cabin, and a lower part (i.e., a space between the central hole and a lower inner wall of the rubber buoy) in the rubber buoy is provided with a water ballast tank. Moreover, the air cabin of each rubber buoy is divided into two sub-cabins by a diaphragm, and any sub-cabin is provided with an air valve; and the water ballast tank of the rubber buoy is divided into two sub-tanks by a diaphragm, and any sub-tank is provided with a water valve, and the diaphragm is arranged in a center of the rubber buoy. This arrangement method not only is conductive to downwardly moving a center of gravity of the breakwater, so that the breakwater has a restoring torque when rotating under the action of waves, but also can make the breakwater reach a certain depth of immersion, thus ensuring the wave absorbing capability of the breakwater, and the division of the cabin improves the overall safety performance of the breakwater.

Further, the cross-shaped pull ring comprises four buttonholes, and the four buttonholes are vertically distributed with each other; for a single-row breakwater, front and rear buttonholes of the cross-shaped pull ring are connected with the corresponding active shackles of front and rear adjacent water-surface wave absorbing structures, and the buttonholes on left and right sides are used to be connected with the active shackles at an upper end of the mooring rope; for a multiple-row breakwater, the front and rear buttonholes of the cross-shaped pull ring are still used for connecting the active shackles of the front and rear adjacent water-surface wave absorbing structures, while the buttonholes on the left and right sides are connected with the active shackles connecting two ends of the connecting anchor chain, so as to install the connecting structure between multiple rows.

Further, the rubber buoy and the anti-sliding device are both made of natural rubber; the bearing rope and the mooring rope are both made of nylon ropes; and the active shackle, the cross-shaped pull ring and the connecting anchor chain are all made of steel.

An outer surface of the bearing rope is wrapped with a layer of smooth hose, which is conductive to reducing a friction force between the rubber buoy and the bearing rope and improving the safety of the breakwater, and a length of the bearing rope is slightly greater than a sum of a length of the rubber buoy and thicknesses of the anti-sliding devices at the two ends.

Further, the water-surface wave absorbing structures are all arranged into a single-row or multiple-row breakwater through the connecting structures and the mooring system according to a sea condition, a size of a protected water area and a wave absorbing requirement, and each row comprises a plurality of water-surface wave absorbing structures.

Beneficial effects: compared with the prior art, the present invention has the following advantages.

(1) The weight and the manufacturing cost of the floating breakwater are reduced by using the inflatable floodable rubber buoy, and using air and seawater as working media, after the work is finished, the air and the seawater are discharged, and the rubber buoy is folded, so that a transportation volume is reduced to improve a transportation efficiency;

(2) the outer surface of the bearing rope is wrapped with a layer of smooth hose, which can reduce the friction force between the rubber buoy and the bearing rope and improve the integral safety of the breakwater;

(3) the plurality of water-surface wave absorbing structures can be simply and quickly connected into a whole by the cross-shaped pull ring and the connecting anchor chain to resist waves together, after the work is finished, the water-surface wave absorbing structures can be quickly separated and effectively evacuated along with an engineering ship, thus reducing a construction time cost and improving a use efficiency of the breakwater; and (4) the mooring rope is connected with the water-surface wave absorbing structure by the active shackle in the mooring system, the operation is simple and quick, after the work is finished, the water-surface wave absorbing structure can be quickly separated from the mooring system, and the mooring system is recovered by a windlass, thus improving the installation and disassembly efficiency and the reuse rate of the breakwater.

DETAILED DESCRIPTION

The present invention is further described below with reference to the drawings.

Figure 1:
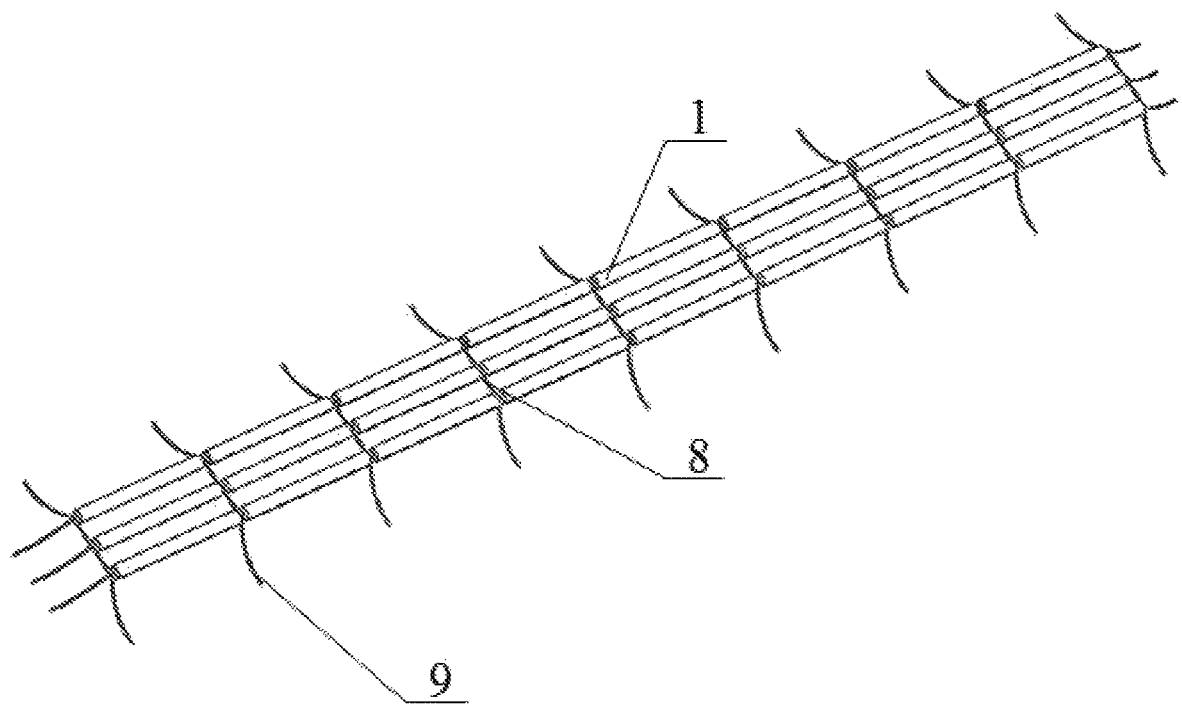
FIG. 1 is an application embodiment of the present invention.
Figure 2:
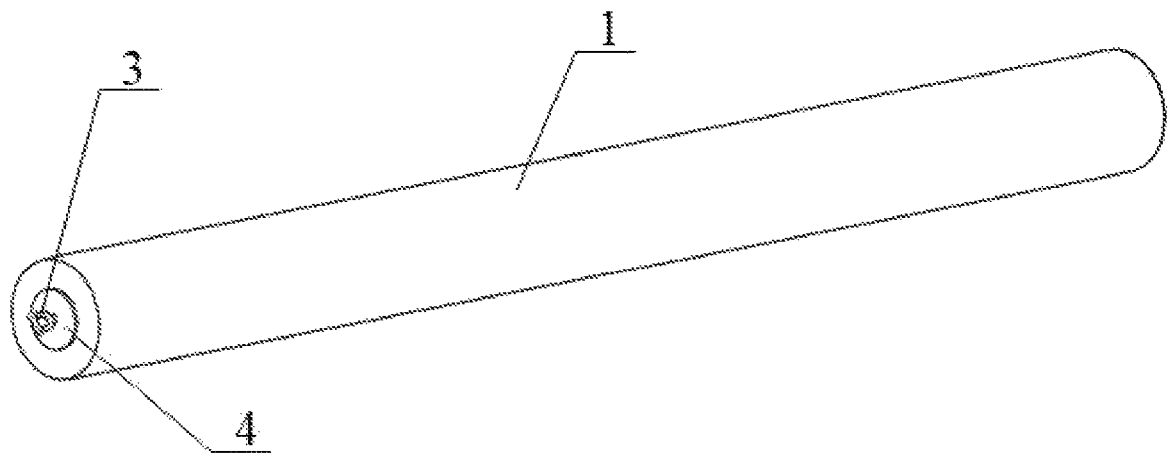
FIG. 2 is a three-dimensional view of a water-surface wave absorbing structure according to the present invention.

As shown in FIG. 1, a multipurpose combined flexible floating breakwater according to the present invention comprises a plurality of water-surface wave absorbing structures and connecting structures, and a mooring system.

As shown in FIG. 1 to FIG. 4, the water-surface wave absorbing structure of the embodiment comprises a rubber buoy 1, a bearing rope 2, active shackles 3 and anti-sliding devices 4; the rubber buoy 1 is made of natural rubber and is provided with a hole with a certain size at a center, and a diameter of the hole is larger than a diameter of the bearing rope 2 and a size of the active shackle 3, so as to facilitate the insertion of the bearing rope 2 into the active shackle 3 in an installation process.

Figure 5:
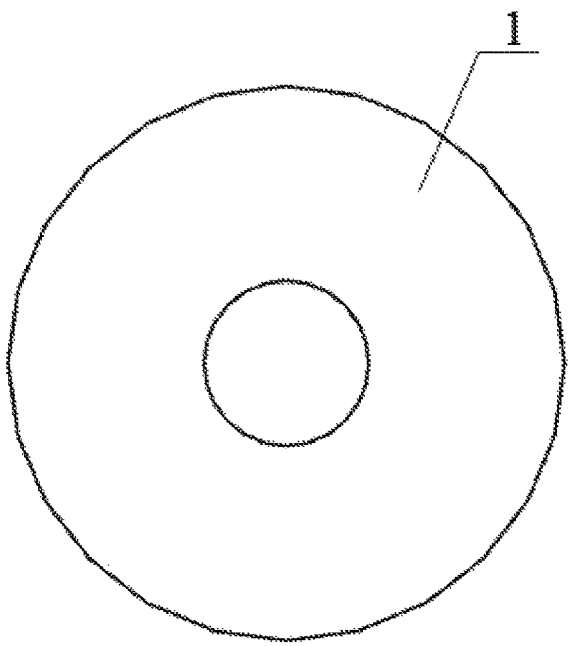
FIG. 5 is a left view of a rubber buoy according to the present invention.
Figure 6:
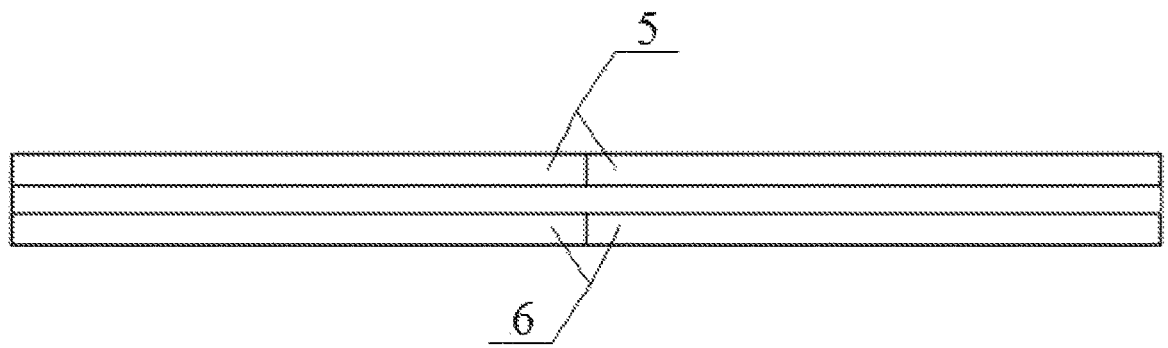
FIG. 6 is a longitudinal sectional view of the rubber buoy according to the present invention.

As shown in FIG. 5 and FIG. 6, the rubber buoy 1 is internally provided with an air cabin 5 and a water ballast tank 6, the air cabin 5 is arranged at an upper part of the rubber buoy 1 and the water ballast tank 6 is arranged at a lower part of the rubber buoy 1. This arrangement method not only is conductive to downwardly moving a center of gravity of the breakwater, so that the breakwater has a restoring torque when rotating under the action of waves, but also can make the breakwater has a certain depth of immersion, thus ensuring the wave absorbing performance of the breakwater. The air cabin 5 is divided into two sub-cabins by a diaphragm, the water ballast tank 6 is divided into two sub-tanks by a diaphragm, and any air sub-cabin is provided with an air valve while any water ballast sub-tank is provided with a water valve.

Figure 3:
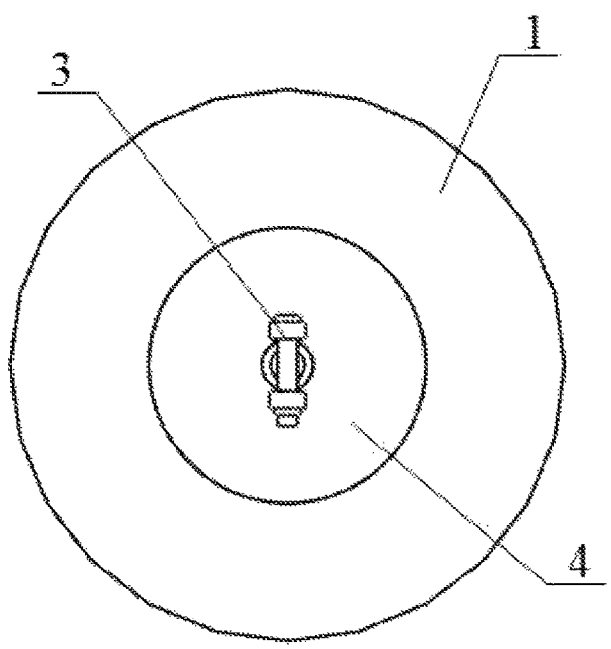
FIG. 3 is a left view of the water-surface wave absorbing structure according to the present invention.
Figure 4:
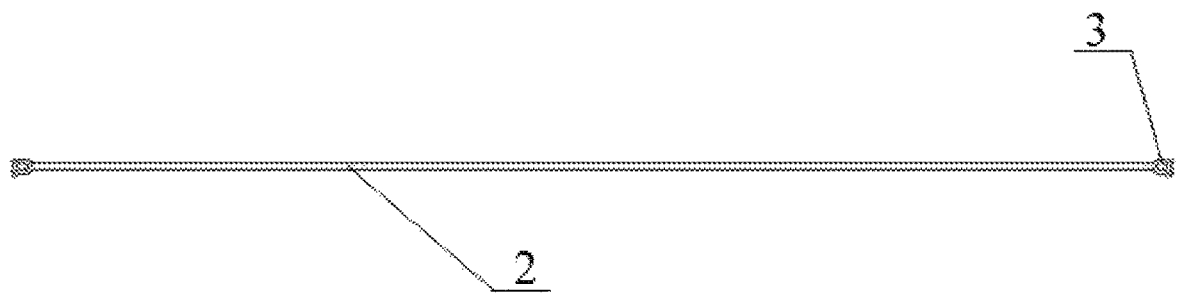
FIG. 4 is a front view of a bearing rope according to the present invention.

As shown in FIG. 3, the bearing rope 2 is made of nylon rope, and a surface is wrapped with a layer of smooth hose, which is conductive to reducing a friction force between the rubber buoy 1 and the bearing rope 2 and improving the safety of the breakwater; and two ends of the bearing rope 2 are connected with the active shackles, a length of the bearing rope is slightly larger than a sum of a length of the rubber buoy 1 and thicknesses of the anti-sliding devices 4 at the two ends.

Figure 12:
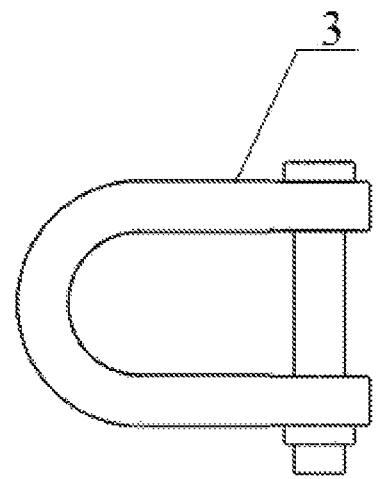
FIG. 12 is a diagram of an active shackle according to the present invention.

As shown in FIG. 12, the anti-sliding device 4 is made of natural rubber and is a circular rubber gasket with a central hole arranged in a center, which is opened and closed through a hanging buckle, and the anti-sliding device is installed on the bearing rope 2 between the rubber buoy 1 and the active shackle 3; a diameter of the anti-sliding device 4 is larger than a diameter of the central hole of the rubber buoy 1, a diameter of the central hole of the anti-sliding device 4 is slightly larger than a diameter of the bearing rope 2 and smaller than a size of the active shackle 3, the design can not only facilitate the installation and disassembly of the anti-sliding device, but also prevent the rubber buoy 1 from sliding freely on the bearing rope 2.

Figure 11:
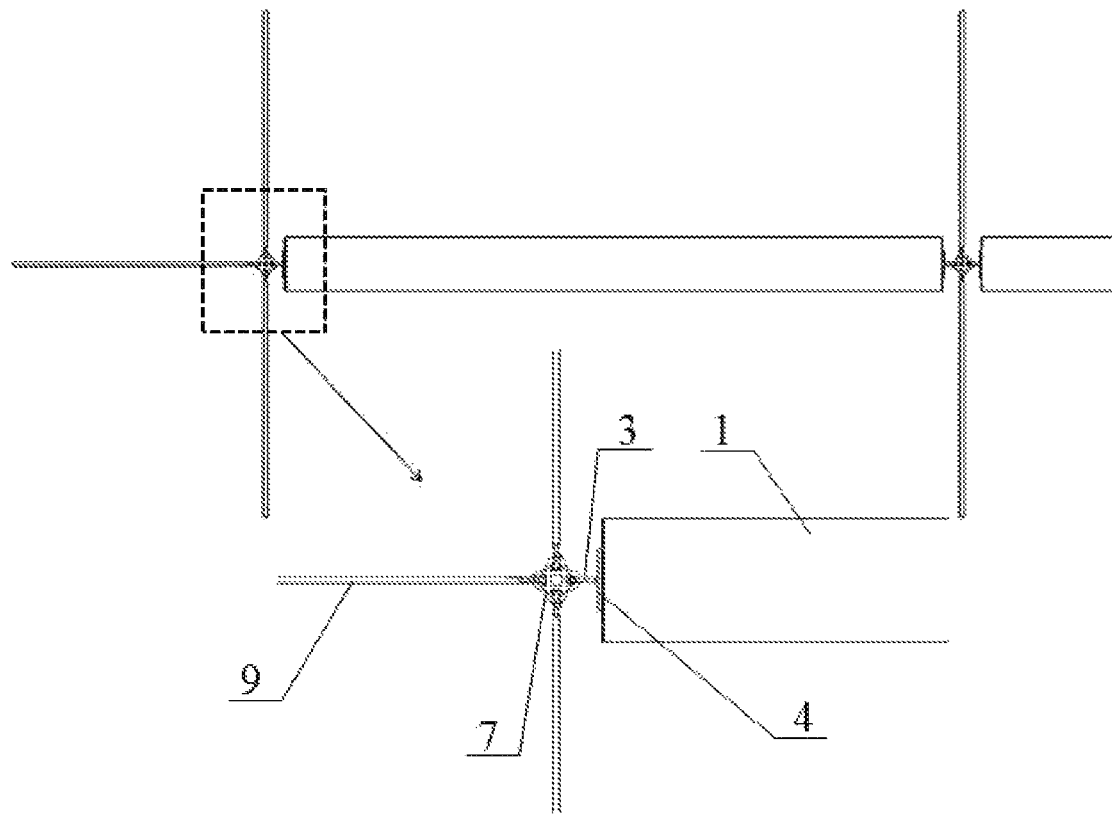
FIG. 11 is a top view of the mooring system according to the present invention.
Figure 13:
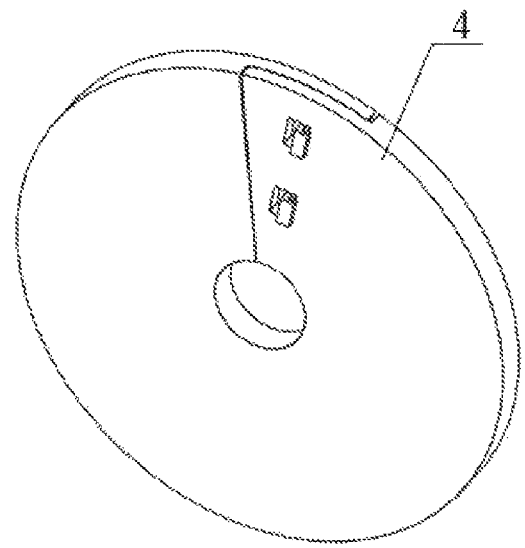
FIG. 13 is a diagram of an anti-sliding device according to the present invention.
Figure 14:
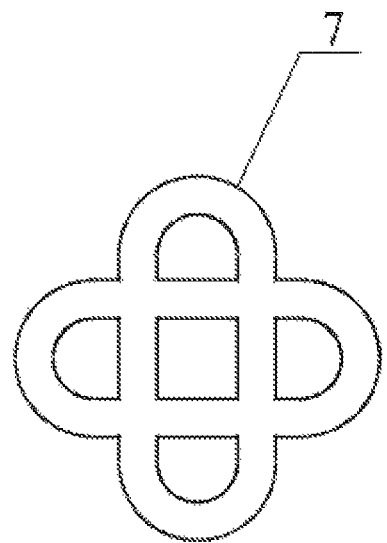
FIG. 14 is a diagram of a cross-shaped pull ring according to the present invention.

In the embodiment, as shown in FIG. 11 and FIG. 13, the connecting structure comprises a cross-shaped pull ring 7 and a connecting anchor chain 8; the cross-shaped pull ring 7 is made of steel and has four vertically distributed buttonholes; the connecting anchor chain 8 is made of steel, and two ends of the connecting anchor chain 8 are connected with the active shackles 3; for a single-row breakwater, front and rear buttonholes of the cross-shaped pull ring 7 are connected with the active shackles 3 of front and rear adjacent water-surface wave absorbing structures, and the buttonholes on left and right sides are used to be connected with the active shackles 3 at an upper end of the mooring rope 9; for a multiple-row breakwater, the front and rear buttonholes of the cross-shaped pull ring 7 are still used for connecting the active shackles 3 of the front and rear adjacent water-surface wave absorbing structures, while the buttonholes on the left and right sides are connected with the active shackles 3 connecting two ends of the connecting anchor chain 8, so as to install the connecting structure between different rows, while the mooring rope 9 is hooked to outward buttonholes of two rows of the cross-shaped pull rings 7 at a periphery by the active shackle 3.

In the embodiment, a semi-tensioned mooring mode is used in the mooring system, the mooring system comprises the bearing rope 9 and the active shackle 3 connected with the upper end of the mooring rope 9, the mooring rope 9 is made of nylon rope, a bottom end is provided with a large-gripping anchor for providing a mooring force required by the breakwater, an upper end is connected with the cross-shaped pull ring 7 of the water-surface wave absorbing structure through the active shackle 3, so that the water-surface wave absorbing structure can be quickly connected with the mooring system, and is also convenient to be separated from the mooring system after the work is finished, thus achieving the effects of quick installation and quick disassembly.

Figure 7:
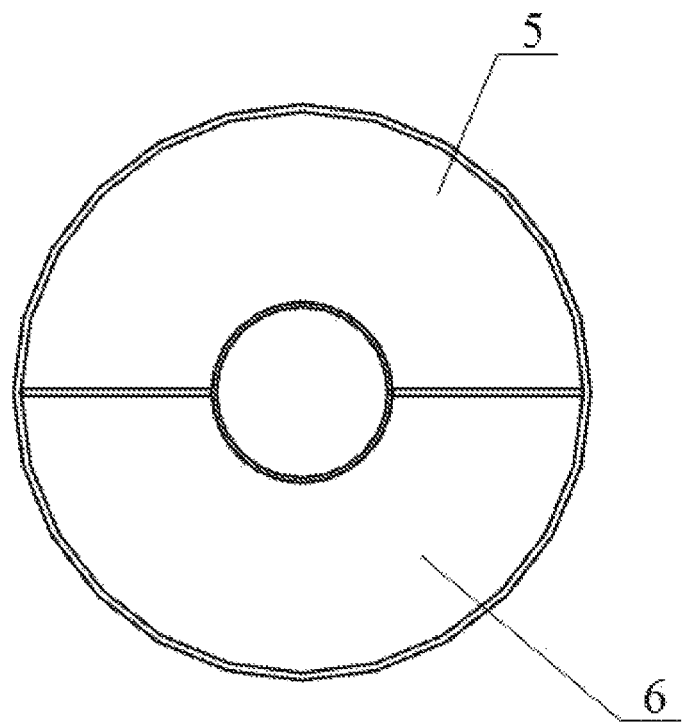
FIG. 7 is a transverse sectional view of the rubber buoy according to the present invention.
Figure 8:
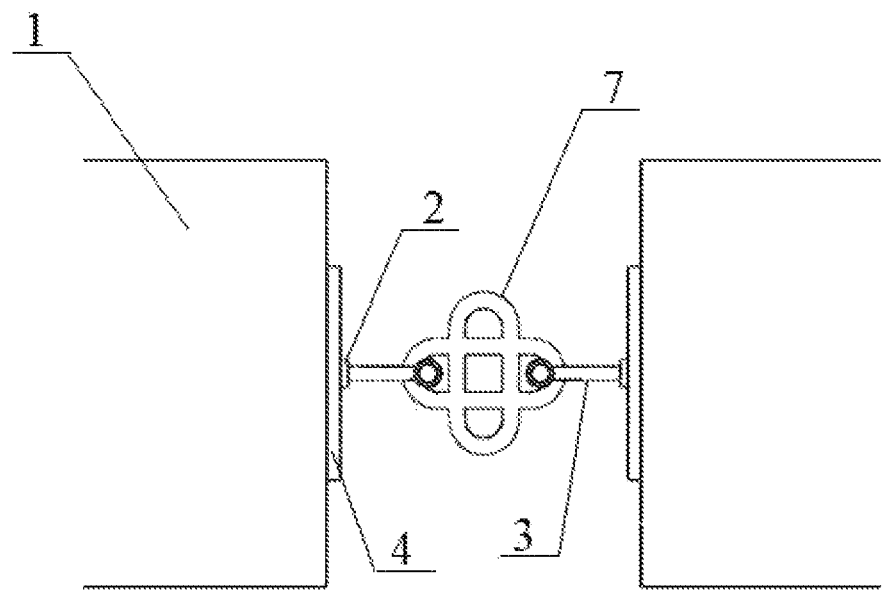
FIG. 8 is a diagram illustrating the connection of adjacent water-surface wave absorbing structures in the same row according to the present invention.

In the embodiment, according to a size of a water area to be protected, a sea state and a wave absorbing requirement, an appropriate number of water-surface wave absorbing structure units or an appropriate number of rows of the breakwaters are selected. As shown in FIG. 7 and FIG. 8, every two adjacent water-surface wave absorbing structure units in the same row are connected by the cross-shaped pull ring 7, and every two adjacent water-surface wave absorbing structure units in different rows (i.e., in the same column) are connected by the connecting anchor chain 8 to form a water-surface wave absorbing device, so as to achieve the overall wave absorbing purpose.

Figure 9:
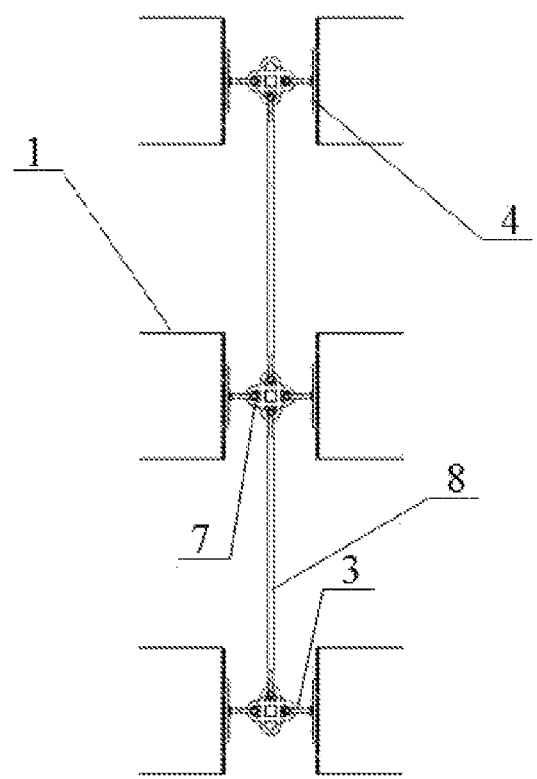
FIG. 9 is a diagram illustrating the connection of adjacent water-surface wave absorbing structures in different rows according to the present invention.
Figure 10:
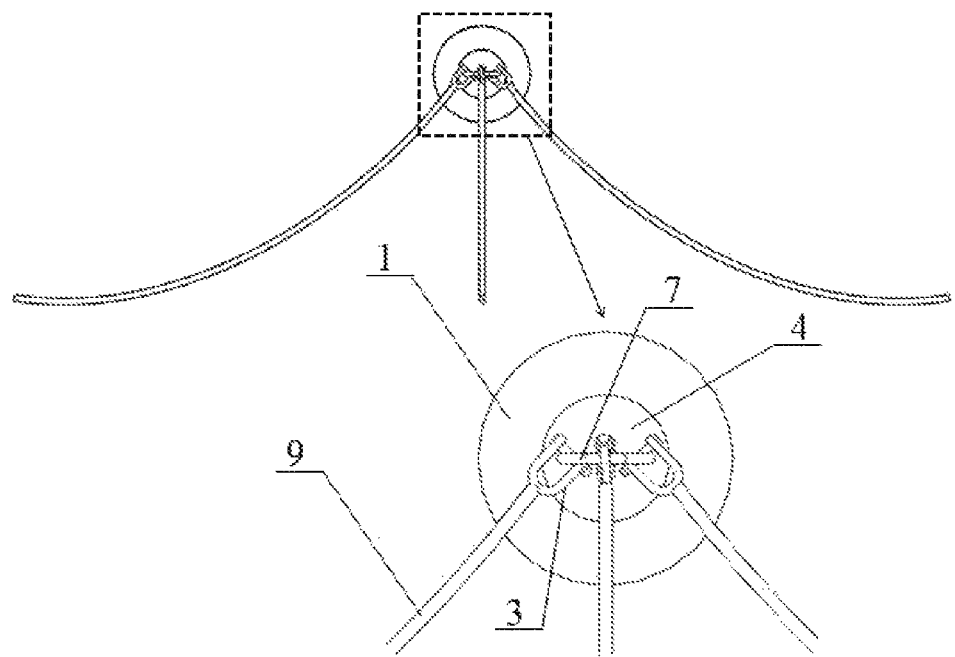
FIG. 10 is a left view of a mooring system according to the present invention.

As shown in FIG. 9 and FIG. 10, an engineering ship transports all parts to the destination during installation, the rubber buoys 1 are connected into a whole through a plurality of cross-shaped pull rings 7 and connecting anchor chains 8, which is temporarily positioned by a tugboat, air is inflated and water is injected into the rubber buoy 1 through an air valve and a water valve, and then the water-surface wave absorbing structure is connected with the mooring system through the active shackle 3 at the upper end of the mooring rope 9 to implement mooring positioning, so as to achieve the purpose of quick installation; and after the work is finished, disassembly and separation are performed in a reverse order, the mooring system is recovered by an anchor windlass for reuse after separation, and finally, all parts are evacuated from the site with the engineering ship.

What is claimed is:

1. A multipurpose combined flexible floating breakwater, comprising a plurality of water-surface wave absorbing structures and connecting structures, and a mooring system, wherein each water-surface wave absorbing structure is connected through the connecting structure, and each water-surface wave absorbing structure is moored and fixed through the mooring system;

each water-surface wave absorbing structure comprises a rubber buoy, a corresponding bearing rope, active shackles and anti-sliding devices, the entire rubber buoy is arranged transversely against waves and is provided with a central hole along a central axis of a body thereof, the bearing rope passes through the central hole of the corresponding rubber buoy and extends out of end surfaces of two ends of the rubber buoy, end parts of two ends of the bearing rope are both provided with the active shackles, and the anti-sliding devices are installed on the bearing rope between the active shackle and the rubber buoy; and the connecting structure comprises a cross-shaped pull ring and a connecting anchor chain, every two adjacent water-surface wave absorbing structures in the same row are connected by the cross-shaped pull ring, every two adjacent water-surface wave absorbing structures in the same column are connected by the connecting anchor chain, and two ends of the connecting anchor chain are also provided with the active shackles.

2. The multipurpose combined flexible floating breakwater according to claim 1, wherein a semi-tensioned mooring mode is used in the mooring system, the mooring system comprises a plurality of mooring ropes, an upper end of the mooring rope is connected with the corresponding water-surface wave absorbing structure through the active shackle, and a bottom end of the mooring rope is provided with a large-gripping anchor.

3. The multipurpose combined flexible floating breakwater according to claim 1, wherein the entire rubber buoy is in a hollow cylinder shape, the central hole is reserved at a position of the central axis, an upper part in the rubber buoy is provided with an air cabin, and a lower part in the rubber buoy is provided with a water ballast tank.

4. The multipurpose combined flexible floating breakwater according to claim 1, wherein the anti-sliding device comprises a circular rubber gasket, a central hole is arranged in a center of the circular rubber gasket and is opened and closed through a hanging buckle, a diameter of the anti-sliding device is larger than a diameter of the central hole of the rubber buoy, and meanwhile, a diameter of a central hole of the anti-sliding device is larger than a diameter of the bearing rope, and the diameter of the central hole of the anti-sliding device is smaller than a size of the active shackle.

5. The multipurpose combined flexible floating breakwater according to claim 3, wherein the air cabin of each rubber buoy is divided into two sub-cabins by a diaphragm, and any sub-cabin is provided with an air valve; and the water ballast tank of the rubber buoy is divided into two sub-tanks by a diaphragm, and any sub-tank is provided with a water valve.

6. The multipurpose combined flexible floating breakwater according to claim 1, wherein the cross-shaped pull ring comprises four buttonholes, and the four buttonholes are vertically distributed with each other.

7. The multipurpose combined flexible floating breakwater according to claim 1, wherein the rubber buoy and the anti-sliding device are both made of natural rubber; the active shackle, the cross-shaped pull ring and the connecting anchor chain are all made of steel; the bearing rope and the mooring rope are both made of nylon ropes; an outer surface of the bearing rope is wrapped with a layer of smooth hose, and a length of the bearing rope is greater than a sum of a length of the rubber buoy and thicknesses of the anti-sliding devices at the two ends.

8. The multipurpose combined flexible floating breakwater according to claim 1, wherein the water-surface wave absorbing structures are all arranged into a single-row or multiple-row breakwater through the connecting structures and the mooring system according to a sea condition, a size of a protected water area and a wave absorbing requirement, and each row comprises a plurality of water-surface wave absorbing structures.

* * * * *